Patented Aug. 30, 1932

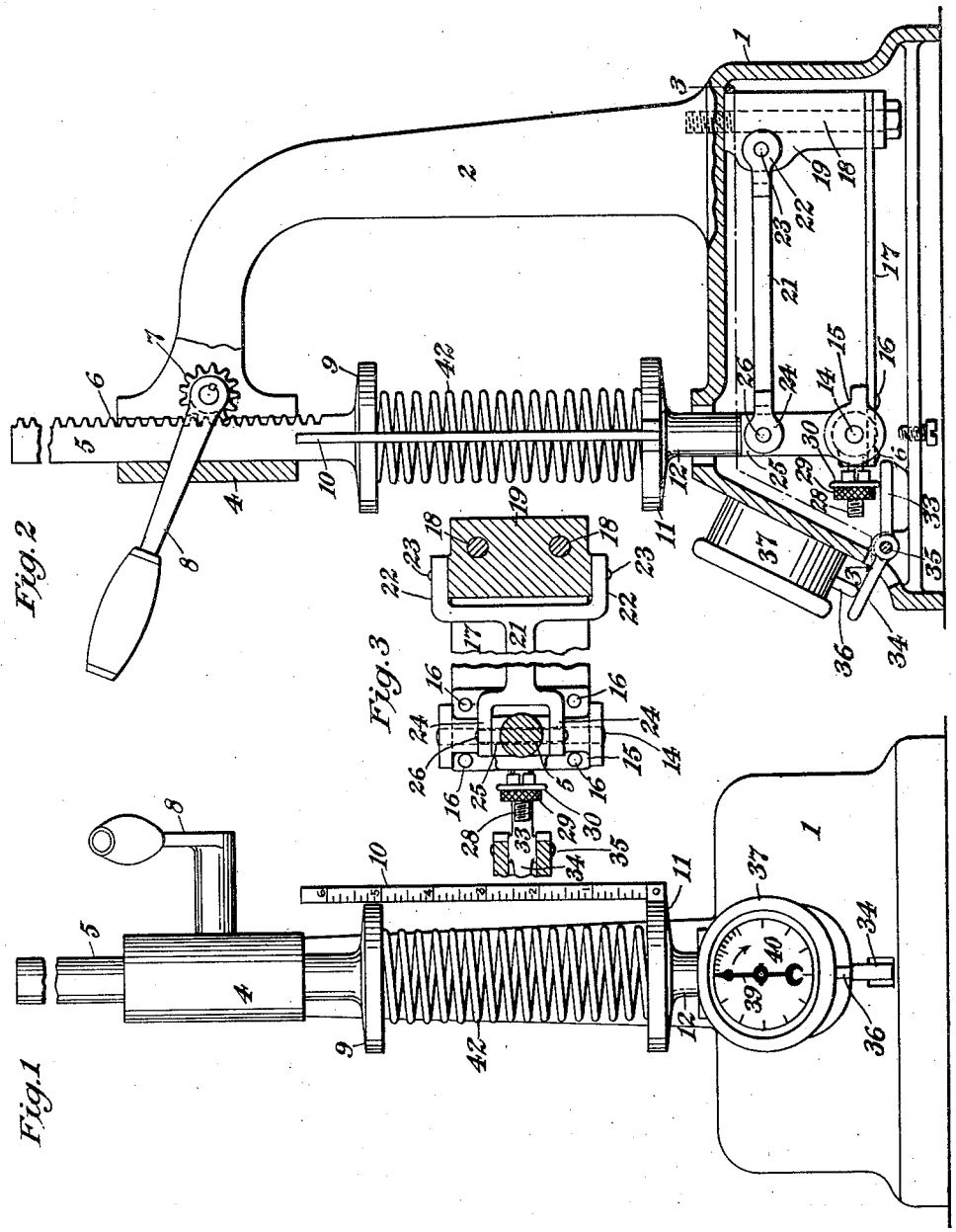

1,874,780

UNITED STATES PATENT OFFICE

JOHN J. McGUCKIN, OF PASSAIC, NEW JERSEY, ASSIGNOR TO RINCK-McILWAINE, INC., OF NEW YORK, N. Y., A CORPORATION OF NEW YORK

SPRING TESTER

Application filed March 13, 1930. Serial No. 435,403.

My invention relates to a spring testing apparatus for conveniently measuring the compression and resistance of coiled springs such, for instance, as are used in internal combustion engines and similar apparatuses.

The objects of my invention are to make a compact and simple apparatus, easily operable, and accurate in simultaneously registering compression and resistance of a spring; to utilize a resistance measuring element having a quite limited scope of movement; to secure means for accurately adjusting the relation of such an element with the pressure recording mechanism; to secure in the apparatus a considerable range of adjustment for the compressing element, so as to adapt it for ready adjustment to springs of varying lengths; and to embody my improvements in a compact and easily portable form, complete in itself and convenient for shop use.

These and other novel features of my invention I will now proceed to explain, referring, in so doing, to the accompanying drawing in which Fig. 1 is a front elevation of a typical embodiment of my invention; Fig. 2 is a side elevation of the same, part of the housing being shown in sections to facilitate the understanding of the constructon; and Fig. 3 is a cross sectional view on a reduced scale taken on the line 3, 3 of Fig. 2 looking down.

In Figs. 1 and 2 a section of the shaft compressing element is shown as broken away, in order to shorten that element for convenient positioning on the drawing.

In each of the figures the same elements are designated by corresponding reference numerals.

The apparatus is arranged in a suitable frame embodying, preferably, a hollow base element 1, a standard 2 and a head 4 in which slides a plunger 5 provided with a toothed rack 6 engaged by a sprocket wheel 7 journaled on the head 4 and actuated by a lever handle 8 keyed, or otherwise fastened, to the sprocket 7 so that the sprocket may be turned by the handle to raise or lower the plunger 5. The lower end of the plunger is provided with an expanded head 9 adapted to form a seat for the upper end of a spring to be tested; the lower edge of the head being in convenient registering relation to a scale 10, carried by the head 11 of a shank 12 which passes down into the base 1 and is supported by a pivot pin 14 passing through its lower end and carried by a bearing block 15 secured, as by bolts 16, 16, near the end of a flat spring 17, the other end of which spring is secured, as by bolts 18, 18 passing through a spacing block or member 19 and tapped into or otherwise secured to the casing frame, so that the end of the spring is rigidly held in place.

A link-bar 21 is provided with arms 22 at one end, which are pivoted as at 23, 23 to the block 19; and the bar 21 is provided at its opposite end with arms 24, 24 embracing a squared portion 25 of the shank 12 and pivoted thereto by a pivot 26. At one side of the block 15 is a pin 28 threaded to receive a nut 29 having a flange 30, which rests upon one arm 33 of the bell crank 33, 34, journaled as at 35 in the base 1, the arm 34 engaging with a plunger 36 which is the actuating element of a conventional dial indicator 37, the hand 39 of which is moved by the plunger 36 to indicate pressure or resistance on a dial 40.

Preliminary adjustment having been made of the flanged nut 29, so that the bending of the spring 17 will be correctly interpreted on the dial 40 by the hand 39, and the plunger 5 having been moved into an approximately correct position by turning the handle 8, a coiled spring 42 may be placed between the heads 9 and 11 and pressure applied to it by moving the handle 8 so as to force down the head 9. The extent of the resulting compression will be indicated by the head 9 upon the scale 10; and the resistance of the spring will be registered through the bending of the flat spring 17, recorded through the flanged nut 29, bell crank 33, 34 and plunger 36 to the hand 39 on the dial 40. The readings from the scale 10 and the dial 40 will give, respectively, the extent of the compression and the resistance of the spring at any desired stage of the test.

It will be understood that the resilience of the spring 17 is to be determined between certain general limits by the size and resistance of the coiled springs which the apparatus may be intended to test, a stiffer flat spring being used where stronger coiled springs are to be tested; and, by selecting a spring 17 of a suitable resistance for the test contemplated, the movements of the head 11 may be kept within very moderate limits, which is desirable in an apparatus of this character.

I desire it to be understood that the form of spring testers illustrated and described above is to be considered as typical and not exclusive. For details of construction may be varied, as by the use of mechanical equivalents, without departing from the spirit of my invention as claimed.

Having thus described my invention, what I claim and desire to secure by Letters Patent of the United States is:—

1. In a coiled spring tester of the class described the combination of a frame, a coiled spring compressor, means for actuating the compressor, coiled spring carrying means, a guide-arm pivoted at one end to the frame and at the other end to the spring carrying means, a flat resistance spring supporting the coiled spring carrying means, means for indicating the resistance of the resistance spring, and means for measuring the extent of compression of the tested spring.

2. In a coiled-spring tester of the class described, the combination of a frame, a coiled-spring compressor, means for actuating the compressor, coiled-spring carrying means, a flat resistance spring supporting the coil-spring carrying means, means for indicating, through the resistance of the resistance spring, the resistance of the coiled spring, connecting means between the resistance spring and the indicating means, adjustable means carried by the resistance spring and engaging the connecting means for varying the influence of the resistance spring on the resistance indicating means, and means for simultaneously measuring the extent of compression of the tested coiled spring.

3. In a coiled spring tester of the class described the combination of a frame, a coiled spring compressor, means for actuating the compressor, coiled spring carrying means, a guide-arm pivoted at one end to the frame and at the other end to the spring carrying means, a flat resistance spring supporting the coiled spring carrying means, means for indicating the resistance of the resistance spring, and means carried by the coiled spring supporting means for measuring the extent of compression of the tested spring.

4. In a coiled-spring tester of the class described, the combination of a frame embodying a base, a standard and a head, a reciprocable compressor carried by the head, reciprocating means therefor, a shaft provided with a head constituting coiled-spring supporting means opposed to the compressor, a substantially flat resistance spring having one end secured fixedly to the base, a head carried by a resilient portion of the resistance spring, a pivotal connection between the shaft and the head, a parallel motion link between the shaft and the base, and means for indicating the deflection of the resistance spring.

5. In a coiled-spring tester of the class described, the combination of a frame embodying a base, a standard and a head, a reciprocable compressor carried by the head, reciprocating means therefor, a shaft provided with a head constituting coiled-spring supporting means opposed to the compressor, a substantially flat resistance spring having one end secured fixedly to the base, a head carried by a resilient portion of the resistance spring, a pivotal connection between the shaft and the head, a parallel motion link between the shaft and the base, means for indicating the deflection of the resistance spring, and adjustable means between the resistance spring and the indicating means for varying the influence of the resistance spring on the indicating means.

6. In a coiled-spring tester of the class described, the combination of a frame embodying, a base, a standard and a head, a reciprocable compressor carried by the head, reciprocating means therefor, a shaft provided with a head constituting coiled-spring supporting means opposed to the compressor, a substantially flat resistance spring having an end secured fixedly to the base, a head carried by resilient portion of the resistance spring, a pivotal connection between the shaft and the head, a parallel motion link between the shaft and the base, means for indicating the deflection of the resistance spring, adjustable means for varying the influence of the resistance spring on the indicating means, and a scale, carried by the coiled-spring supporting means, for measuring the movement of the compressor relative to the supporting means.

7. In a coiled-spring tester of the class described, the combination of a frame embodying a base, a standard and a head, a reciprocable compressor carried by the head, reciprocating means therefor, a shaft provided with a head constituting coiled-spring supporting means opposed to the compressor, a substantially flat resistance spring having one end secured fixedly to the base, a head carried by a resilient portion of the resistance spring, a pivotal connection between the shaft and the head, a parallel motion link between the shaft and the base, means for indicating the deflection of the resistance spring, and adjustable means, embodying a threaded shank and an adjustable nut thereupon, for varying the influence of the resistance spring on the indicating means.

JOHN J. McGUCKIN.